Sept. 29, 1942.  W. SCHOLZ  2,297,436
ARRANGEMENT FOR TESTING THE FREQUENCY CHARACTERISTIC
OF ELECTRIC TRANSMISSION DEVICES
Filed Oct. 24, 1939  2 Sheets-Sheet 1

Inventor:
Werner Scholz
by E. D. Phinney
Att'y

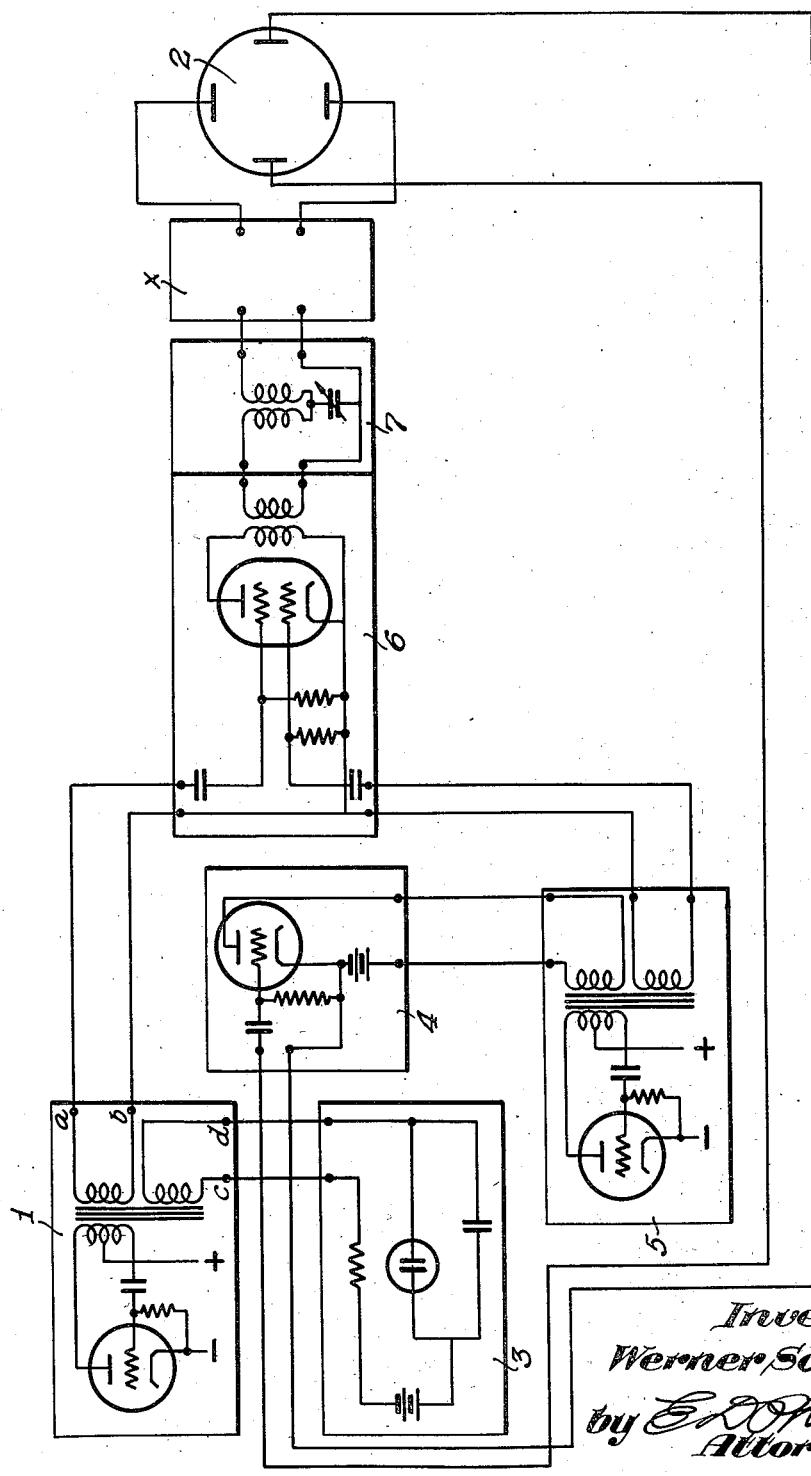

Patented Sept. 29, 1942

2,297,436

UNITED STATES PATENT OFFICE 2,297,436

ARRANGEMENT FOR TESTING THE FREQUENCY CHARACTERISTIC OF ELECTRIC TRANSMISSION DEVICES

Werner Scholz, Berlin, Germany; vested in the Alien Property Custodian

Application October 24, 1939, Serial No. 301,002
In Germany November 19, 1937

1 Claim. (Cl. 175—183)

The frequency characteristic of electrical transmission devices has in accordance with a well known method been measured by connecting to the input of the transmission member to be tested, for example, an amplifier, an alternating current generator of variable frequency and adjustable terminal voltage, and by measuring at the output terminals the output potentials derived from the same input potentials of the applied testing frequencies. The curve representing the frequency characteristic is thus obtained by a series of individual measurements. This rather tedious procedure may be accelerated by using a device provided with mechanically actuated contacts, and by employing a Braun tube as the reading instrument; but the drawbacks involved by the mechanical switching means and also by the recording of the curve from individual tests are not fundamentally eliminated.

In comparison with this known method the arrangement according to the inventon represents a technical advance in so far as thereby a continuous and periodically varying testing is provided, and the frequency curve of the transmission member to be tested is directly shown on the luminous screen of a Braun tube without the use of mechanically moved parts. A particular advantage of the new arrangement is the fact that it is possible to follow on the luminous screen the effect of adjustments, for instance, made in the circuit arrangement of the transmission member to be tested (for example, when trimming intermediate frequency amplifiers in broadcasting and television receivers). This involves a great saving of time and is hence of particular importance in the balancing of mass-produced wide-band receivers.

In the accompanying drawings

Figure 1:
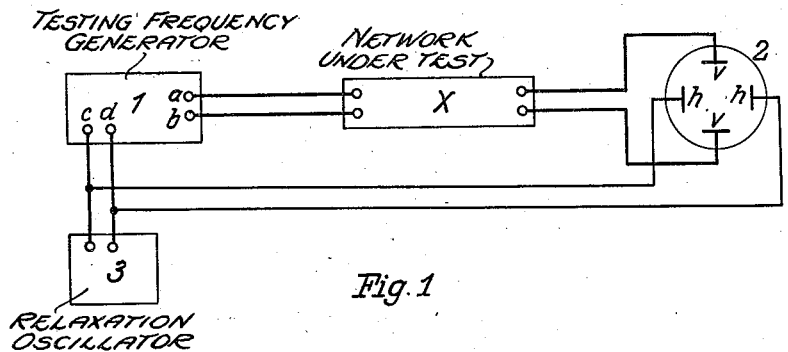
Figure 2:
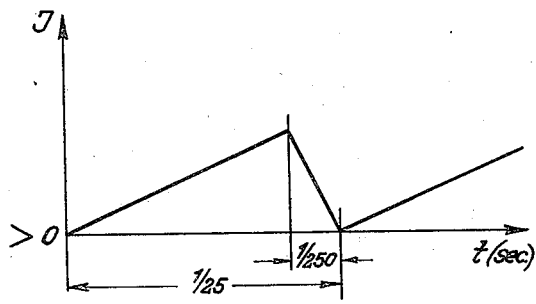
Figure 3:
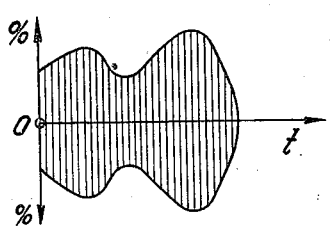

Fig. 1 is a diagram representing one form of testing arrangements as provided by the invention, Figs. 2 and 3 are graphic representations which serve to explain the function of these arrangements and Fig. 4 is a diagram showing a second embodiment of the invention.

In Fig. 1, I represents the testing-frequency generator, 2 the deflecting system of a Braun tube, 3 a relaxation apparatus for the generation of saw-tooth currents, and X the transmission member of which the frequency characteristic is to be tested. The frequency-determining oscillatory circuit of I contains a high frequency coil with a high frequency iron core (for example, of ferrocart) of which the premagnetization can be varied by a special magnetising winding connected to the terminals $c$ and $d$ (Fig. 4). Since, as is well known, the self-inductance of a high frequency coil with iron core varies within certain limits continuously with its premagnetization, the testing frequency yielded by the testing generator I on the output terminals $a$ and $b$ is determined by the strength of the current supplied to the terminals $c$ and $d$. The frequency-determining oscillatory circuit can, for example be the tuning circuit of an electron tube circuit. In the relaxation apparatus 3 by means of well known electrical relaxation circuits saw-tooth shaped currents can be generated, for example, of the form indicated in Fig. 2 and of the frequency 25/sec. (I=current, $t$=time). The saw-tooth current, connected in a suitable manner to an ohmic resistance, supplies the deflecting potential for the horizontally acting deflection plates $h$ of the Braun tube 2 of which the vertically acting deflection plates $v$ are applied to the output terminals of the transmission member X to be tested. If, moreover, there be connected to the output terminals of the relaxation apparatus 3 through the terminals $c$ and $d$ the magnetising coil of the testing frequency generator I, then its frequency is continuously varied within certain limits in the rhythm of the relaxation oscillations and in such a way that the testing frequency first of all becomes slowly higher in accordance with the slow rise of current, and when the current is relaxed returns back rapidly to its initial value. By suitable switching members in the testing-frequency generator it can be obtained that the potential supplied from its output terminals is of equal magnitude at all frequencies of the pass range. If this testing potential, periodically varying its frequency, is supplied through the transmission member X to be tested to the deflecting plates $v$ of the Braun tube, then the light beam shows on the luminous screen the frequency characteristic of X as a continuous image, as the horizontal deflection in 2, and the frequency variation in I are synchronously effected by the same relaxation potential. To each time-point of the horizontal deflection the same testing frequency belongs while the vertical-deflection potential is in proportion to the permeability of the transmission member X for this testing potential at any time-point. If the horizontal coordinate is calibrated in per cent permeability, or in degrees of amplification factor, then on the luminous screen the frequency characteristic of X can be immediately read in figures, as will be understood from Fig. 3. If the potential on the output terminals of X be not sufficient for effecting the deflection, then it must previously be amplified by an amplifier whose frequency characteristic is known.

The premagnetization of the high frequency iron core in the testing generator 1 is preferably obtained in well-known manner by the fact that the magnetization winding is arranged outside the high frequency coil on a core of normal magnetic sheet metal which is magnetically connected in series with the high frequency iron core. By powerful premagnetization the natural frequency of the high frequency core can be increased up to about 5%. This is not sufficient in the televisior art if the intermediate carrier frequency be low in proportion to the maximum modulation frequency, for example 8,000 kilocycles, carrier frequency at 2,000 kilocycles modulation frequency band-width. In order to obtain with this arrangement periodically passing test frequencies, for example of 6,000 to 8,000 kilocycles, the initial frequency of the testing generator is chosen at 40,000 kilocycles and is by premagnetization periodically increased by 5%, that is, increased to 42,000 kilocycles, and this range of 40,000 or 42,000 kilocycles is now translated by heterodyning with a constant frequency of, for example, 34,000 kilocycles down to the desired value. This range can be extended by about double (6,000–10,000 kilocycles) if, instead of a constant heterodyne frequency a second testing frequency generator be used for heterodyning, of which the initial frequency of 34,000 kilocycles is periodically varied synchronously but in opposition to that of the first testing frequency generator in a suitable manner controlled by the same relaxation apparatus. An arrangement of this kind consists in accordance with Fig. 4 of the following parts: the testing frequency generator 1, the Braun tube 2, the relaxation apparatus 3, a phase reversing apparatus 4 for the opposite control of the second testing generator 5, a mixing stage 6, and an assembly of frequency dependent members 7 such as a band pass filter which yields the passing testing frequency supplied by 6 in the desired range to the transmission member to be tested.

The relaxation oscillations from oscillator 3 are applied directly to testing frequency generator 1, to produce the variable frequency control as described above, and to horizontal deflecting electrodes $h$ of cathode ray tube 2. At the same time the oscillations from oscillator 3 are applied through a phase reversing network 4 to a similar auxiliary testing generator 5. Because of this phase reversal generator 1 varies in the opposite direction from generator 3, and preferably also from a lower initial frequency. The energy from generators 1 and 5 are combined in mixing circuit 6, so as to obtain a difference frequency. Thus, if generator 1 varies between 40,000 kc. and 42,000 kc., and generator 5 between 34,000 kc. and 32,000 kc., it is seen that a frequency sweep due to the beat frequency between 6,000 kc. and 10,000 kc. is obtained.

There will, however, be a considerable frequency content of other frequencies due to the mixing stage inherent distortion. To remove the effects of such frequencies a band pass filter 7 is provided so that only frequencies of the desired range are applied over the apparatus X under test to electrodes V of tube 2.

The testing arrangements described above can be simplified in such manner that instead of the relaxation potential of the relaxation apparatus 3 technical alternating current (for example 50 cycles) from the heavy-current mains is used for the synchronous control of the testing frequency generator and the horizontal deflection of the electron beam in the Braun tube. This is of great advantage when the input and output terminals of the transmission member to be tested are at a great distance from each other, for example in a cable which is already laid. Instead of a special synchronisation line between the testing frequency generator and relaxation apparatus, both situated at the beginning of the cable, and the Braun tube at the end of the cable, the alternating current network can be used if synchronous alternating current is available at both points.

What is claimed is:

An arrangement for testing the frequency characteristics of an electrical transmission system, comprising a testing frequency generator including a tuned circuit having a core of ferrous material and a magnetizing winding therefor, a relaxation oscillator having an output circuit including said magnetizing winding whereby the self-inductance of said tuned circuit may be varied repeatedly under control of impulses from said oscillator, a second testing generator, means for controlling said second generator from said relaxation oscillator but in opposite direction to the first mentioned testing frequency generator, means for heterodyning the output of the first mentioned testing frequency generator with the ouput of the second testing generator to produce a lower resultant output frequency range, transmission apparatus to be tested, means to apply said resultant output frequency to the input of said transmission apparatus, a Braun tube, circuits connecting one pair of electron deflecting plates of said tube to the output circuits of said transmission apparatus, and other circuits connecting a second pair of electron deflecting plates of said Braun tube to the output circuit of said relaxation oscillator.

WERNER SCHOLZ.